United States Patent
Price et al.

(10) Patent No.: US 6,679,632 B2
(45) Date of Patent: Jan. 20, 2004

(54) LUBRICANT RETENTION DESIGN FOR DISK DRIVE FLUID DYNAMIC BEARING SPINDLE MOTOR

(75) Inventors: Kirk B. Price, San Jose, CA (US); Daniel R. Stacer, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 10/159,164

(22) Filed: May 30, 2002

(65) Prior Publication Data
US 2003/0223661 A1 Dec. 4, 2003

(51) Int. Cl.⁷ .............................. F16C 33/74
(52) U.S. Cl. ........................ 384/119; 384/130
(58) Field of Search ................. 384/119, 114, 384/107, 124, 130

(56) References Cited

U.S. PATENT DOCUMENTS

| | | |
|---|---|---|
| 4,883,367 A | 11/1989 | Maruyama |
| 5,246,294 A | 9/1993 | Pan |
| 5,487,608 A | 1/1996 | Leuthold et al. |
| 5,516,212 A | 5/1996 | Titcomb |
| 5,707,154 A | 1/1998 | Ichiyama |
| 5,901,013 A | 5/1999 | Lee et al. |
| 5,993,066 A | 11/1999 | Leuthold et al. |
| 6,034,454 A | 3/2000 | Ichiyama |
| 6,059,459 A | 5/2000 | Ichiyama |
| 6,066,903 A | 5/2000 | Ichiyama |
| 6,126,320 A | 10/2000 | Ichiyama |
| 6,147,424 A | 11/2000 | Gomyo et al. |
| 6,195,895 B1 | 3/2001 | Wuester, Sr. et al. |

FOREIGN PATENT DOCUMENTS

| | | |
|---|---|---|
| JP | 08-275448 | 10/1996 |
| JP | 11-264410 | 9/1999 |
| JP | 2001-221228 | 8/2001 |
| JP | 2001-258204 | 9/2001 |

Primary Examiner—Lenard A Footland
(74) Attorney, Agent, or Firm—Robert B. Martin; Bracewell & Patterson, L.L.P.

(57) ABSTRACT

A lubricant retention design for a fluid dynamic bearing design in a spindle motor utilizes a labyrinth gap that is formed between the sleeve and the shaft of the bearing. The gap is used in conjunction with a barrier film to impede the flow of lubricant into the lateral and axial vent holes during non-operational vibration, such as shipping and handling of the end product. In another version, a plug is located in the lateral vent hole. The plug has a very small passage that permits air to pass therethrough for atmospheric pressure equalization, but prevents the escape of lubricant into the vent holes. Alternatively, the plug may be formed from a non-wettable material such as porous foam or sintered material and provided with a larger opening. Yet another solution utilizes a combination of both the labyrinth and plug designs.

13 Claims, 4 Drawing Sheets

LUBRICANT RETENTION DESIGN FOR DISK DRIVE FLUID DYNAMIC BEARING SPINDLE MOTOR

BACKGROUND OF THE INVENTION

1. Technical Field

The present invention relates in general to an improved spindle motor design for a computer hard disk drive, and in particular to an improved lubricant retention design for a disk drive fluid dynamic bearing spindle motor.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating.

A typical HDD also utilizes an actuator assembly. The actuator moves magnetic read/write heads to the desired location on the rotating disks so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

Typically, a plurality of the hard disks are stacked vertically on a common spindle that is turned by a disk drive motor at several thousand revolutions per minute (rpm). FIG. 1 depicts a sectional side view of a conventional fluid dynamic bearing design for a spindle motor. One axial end of a shaft 11 (lower end in FIG. 1) is rigidly mounted to the mount flange 12 of the spindle motor. The other axial end of shaft 11 (upper end in FIG. 1) may be provided with optional internal threads so that the disk drive cover (not shown) can be attached to shaft 11 with a screw. The two zones of shaft 11 adjacent to the thrust plates 15 have precise diameters and provide stationary surfaces for the radial fluid dynamic bearings. Shaft 11 is located in a bearing sleeve 13 with the pair of thrust plates 15 therebetween. The flange at the top of sleeve 13 is used to center a disk clamp (not shown). Thrust plates 15 are fixed to shaft 11 and provide the stationary surfaces of the axial fluid dynamic bearing.

Still referring to FIG. 1, a small clearance is located between the outer diameter of thrust plates 15 and sleeve 13. The clearance acts as a reservoir for excess lubricant, and helps to prevent the lubricant from escaping. If any excess lubricant escapes the reservoir, end seals 16 are provided to prevent the lubricant from escaping the spindle motor. Sleeve 13 provides the rotating fluid dynamic bearing surfaces for both the axial and radial bearings. The materials used to form shaft 11, sleeve 13, and thrust plates 15 and their surface treatments must be appropriate to survive wear and ensure reliable function of the disk drive.

As shown on the right sides of FIGS. 2 and 3, the center of the assembly is also provided with at least one lateral vent hole 19 which is interconnected to an axial vent hole 21 that extends through shaft 11. Vent holes 19, 21 are needed to equalize the atmospheric pressure exerted on both sides and both ends of the assembly.

When the assembly is subjected to non-operational vibration, such as during shipping or other handling when the disk drive is not in use, lubricant 17 migrates toward lateral vent hole 19. A barrier film 20 is provided at lateral vent hole 19 on both shaft 11 and sleeve 13 in order to resist the flow of lubricant into lateral vent hole 19. However, during extreme non-operation vibrational loads, such as high amplitude vibration encountered during transportation of the product, barrier film 20 is inadequate to impede the flow of lubricant 17. Under such conditions, some of lubricant 17 can overcome barrier film 20 and enter vent holes 19 and 21, thereby degrading the lubrication performance and causing contamination. Lubricant 17 that migrates into the vent holes 19, 21 will not return to the bearing interface surfaces, which could result in failure of the bearing. Thus, an improved lubricant retention design for a fluid dynamic bearing in a spindle motor which overcomes the limitations of prior art designs is needed.

SUMMARY OF THE PRESENT INVENTION

One embodiment of a lubricant retention design for a fluid dynamic bearing design for a spindle motor is disclosed. A labyrinth gap is formed between the sleeve and the shaft of the bearing and is used in conjunction with a barrier film to impede the flow of lubricant into the lateral and axial vent holes during non-operational vibration, such as shipping and handling of the end product. In another embodiment of the present invention, a plug is located in the lateral vent hole. The plug has a very small passage that permits air to pass therethrough for atmospheric pressure equalization, but prevents the escape of lubricant into the vent holes. Alternatively, the plug may be formed from a non-wettable material such as porous foam or sintered material and provided with a larger opening. Yet another solution utilizes a combination of both the labyrinth and plug designs.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 1:
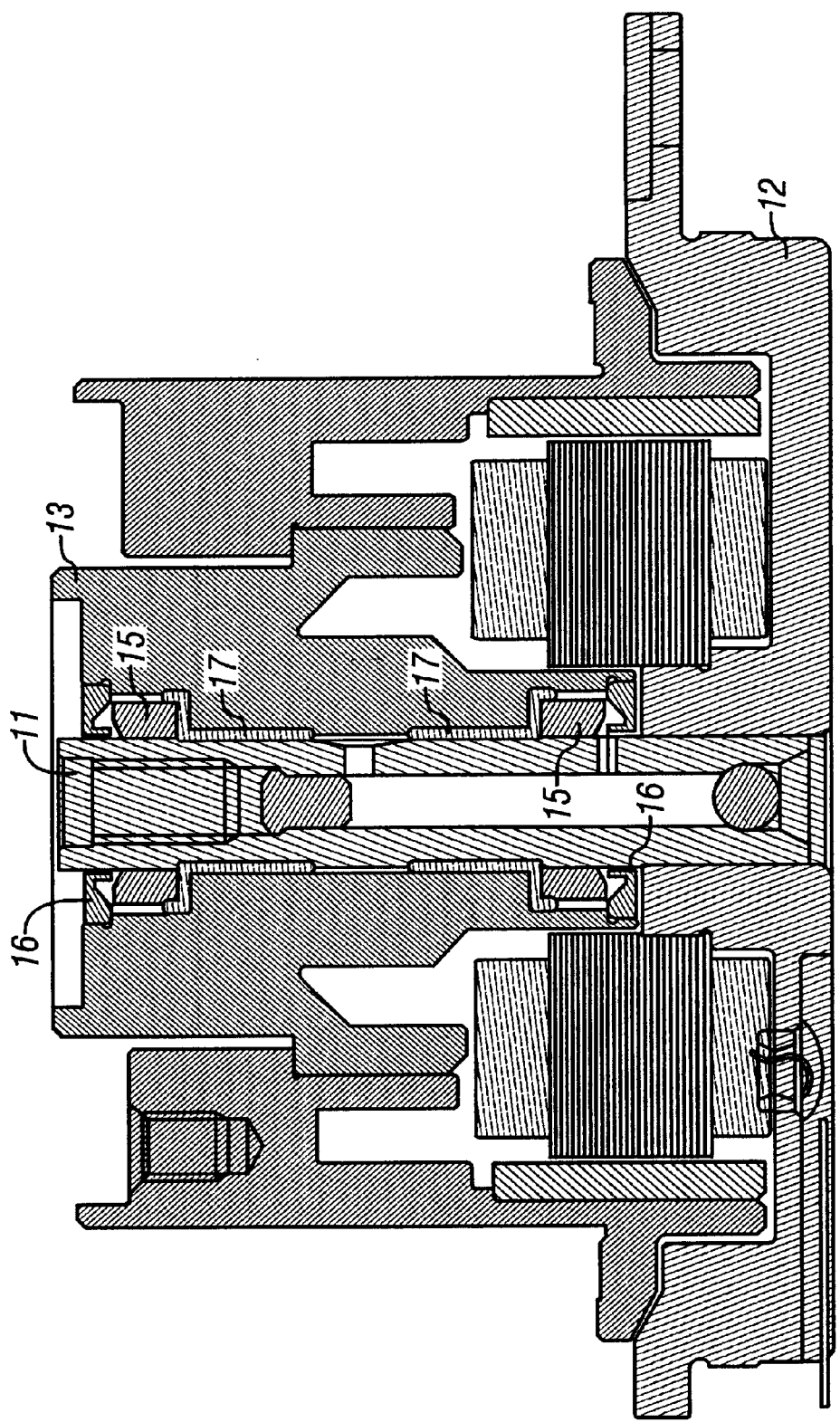
FIG. 1 is a sectional side view of a conventional fluid dynamic bearing design for a spindle motor.
Figure 2:
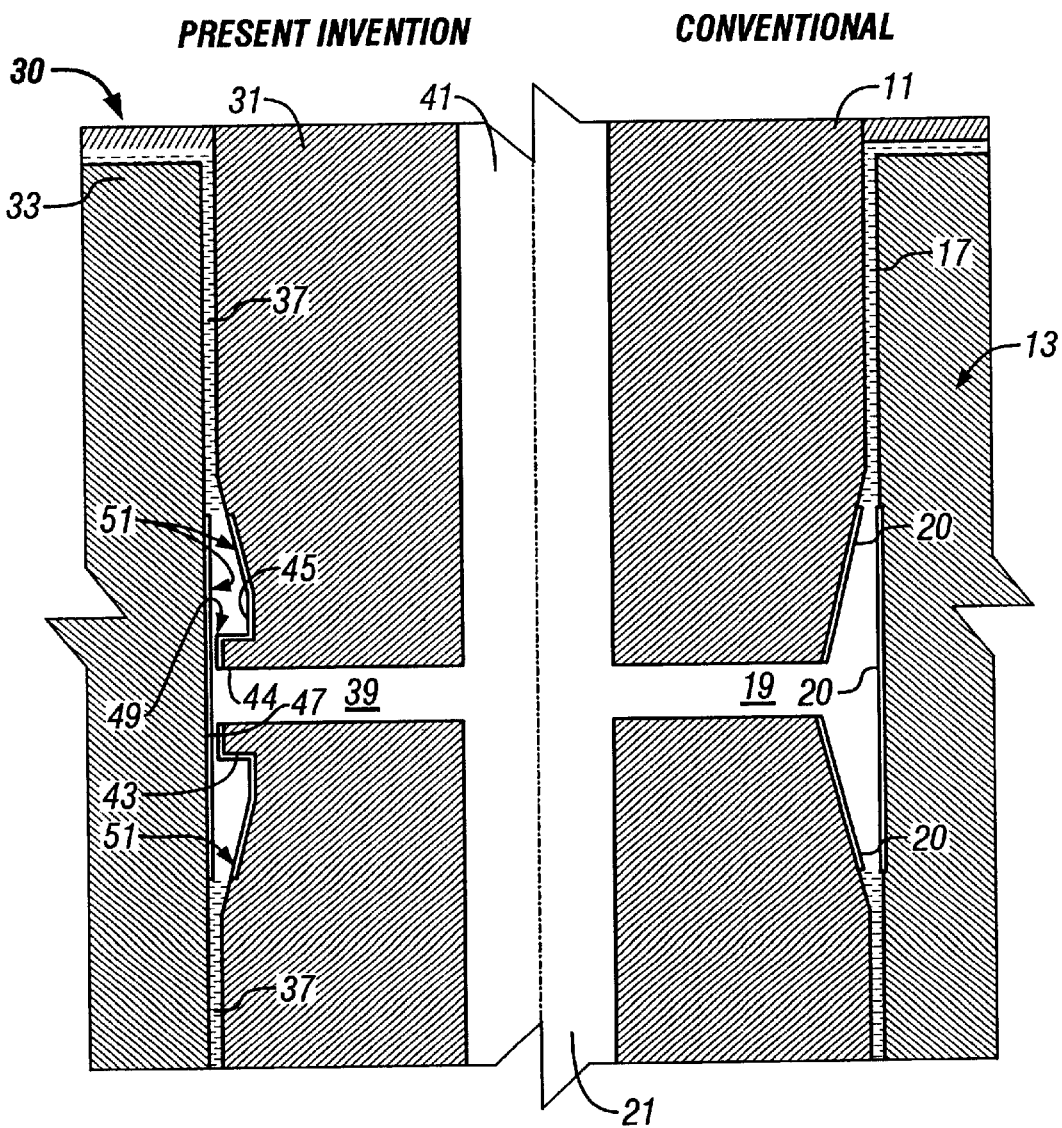
FIG. 2 is an enlarged, split sectional side view of a central portion of a fluid dynamic bearing showing, on the right side, the conventional design of FIG. 1, and, on the left side, a first embodiment of a design constructed in accordance with the present invention.

Referring now to the left side of FIG. 2, a central portion of a fluid dynamic bearing 30 for a spindle motor that is constructed in accordance with a first embodiment of the present invention is shown. For ease of comparison with the prior art, a conventional bearing design is depicted on the right side of FIG. 2, which is part of the overall spindle assembly of FIG. 1. Fluid dynamic bearing 30 includes a shaft 31 that is located in an axial bore of a bearing sleeve 33. A lubricant 37 is located between shaft 31 and sleeve 33 on both ends of the assembly to reduce friction during operation. The assembly has at least one lateral vent hole 39 extending radially through shaft 31 (see FIG. 5). Lateral vent hole 39 is interconnected with an axial vent hole 41 that extends axially through shaft 31. Vent holes 39, 41 are needed to balance the atmospheric pressure exerted on both sides and both ends of the assembly.

Figure 5:
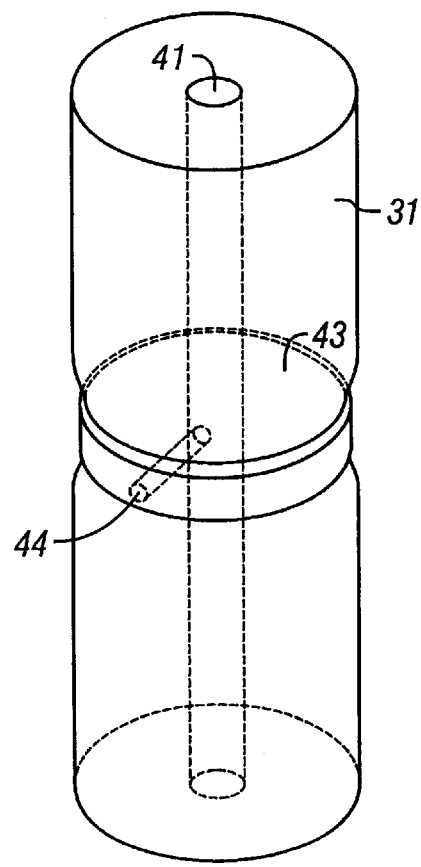
FIG. 5 is an isometric view of a shaft of the fluid dynamic bearing of the left side of FIG. 2.

Again referring to the left side of FIG. 2 and to FIG. 5, the portion of shaft 31 through which lateral vent hole 39 extends is completely circumscribed by an annular ring 43. In the embodiment shown, ring 43 is machined from the bar stock which forms shaft 31. A small radial hole 44, which is provided for ventilation, extends through ring 43 and is in communication with lateral vent hole 39. Ring 43 protrudes radially outward from a recess 45 which circumscribes the lateral side of shaft 31. In the version shown, recess 45 has a substantially conical profile. Ring 43 does not contact inner surface 47. The distance or clearance 49 between the outer surface of ring 43 and the radial inner surface 47 of sleeve 33 is, for example, approximately 50 μm.

The size of clearance 49 is a tradeoff between what is required for functionality and the requirements for ease of manufacturing. A smaller clearance 49 is better for function but more difficult to manufacture because it requires tighter tolerances. Clearance 49 functions as a labyrinth seal for the lubricant 37 as it protrudes from shaft 31. Although not drawn to scale in the version shown, clearance 49 is not the smallest radial distance between shaft 31 and sleeve 33. The smallest radial distance between shaft 31 and sleeve 33 is located at the bearing surfaces on both axial sides of lateral vent hole 39. In addition, ring 43, recess 45, and an adjacent portion of surface 47 are all coated with a barrier film 51 (also not drawn to scale) to resist the flow of the impinging lubricant 37. Barrier film 51 does not obstruct hole 44 in ring 43 to allow for ventilation therethrough.

In operation, when bearing 30 is subjected to non-operational vibration, such as during the shipping or other handling of the end product when the end product is not in use, lubricant 37 may migrate toward lateral vent hole 39. The labyrinth seal formed by clearance 49 as ring 43 protrudes from shaft 31 prevents the migration of lubricant 37 into lateral vent hole 39, even under the most severe non-operational vibration loads. In addition, barrier film 51 helps resist the flow of lubricant toward ring 43 and clearance 49.

Figure 4:
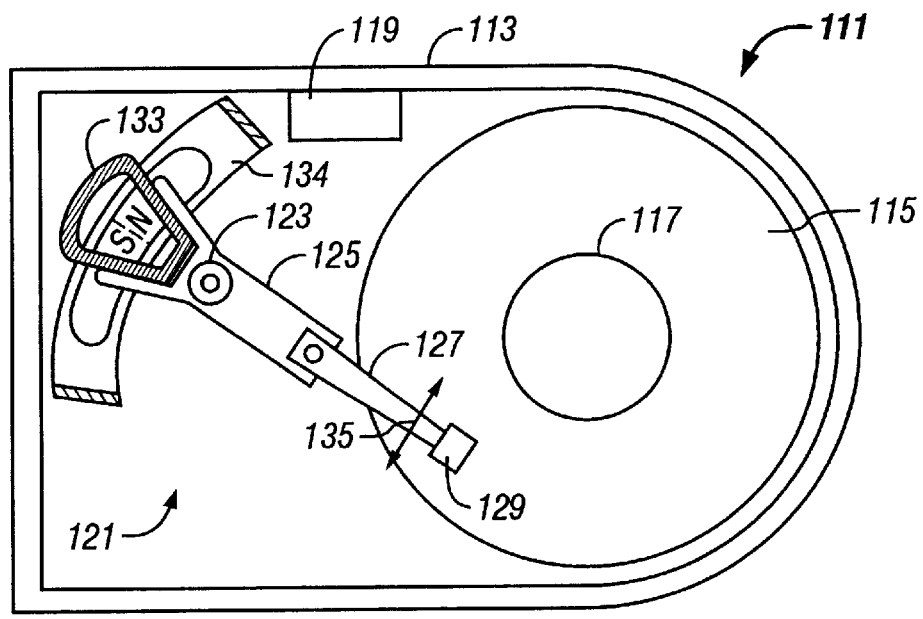
FIG. 4 is a schematic drawing of a hard disk drive constructed in accordance with the present invention.

One application for the present invention is depicted in FIG. 4. An information storage system comprising a magnetic hard disk file or drive 111 utilizes the present invention. Drive 111 has an outer housing or base 113 containing a plurality of stacked, parallel magnetic disks 115 (one shown) which are closely spaced apart. Disks 115 are rotated by a spindle motor assembly having a central drive hub 117 which utilizes fluid dynamic bearing 30. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

Each arm 125 has extending from it at least one load beam or suspension 127. A magnetic read/write transducer or head 129 is mounted on a slider and secured to a flexure that is flexibly mounted to each suspension 127. The read/write heads 129 magnetically read data from and/or magnetically write data to disks 115. Suspensions 127 are biased against disks 115 to enable the creation of the air bearing film between the slider and disk surface. A voice coil 133 housed within a voice coil motor magnet assembly 134 is also mounted to arms 125 opposite the head gimbal assemblies. Movement of the actuator 121 (indicated by arrow 135) moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 3:
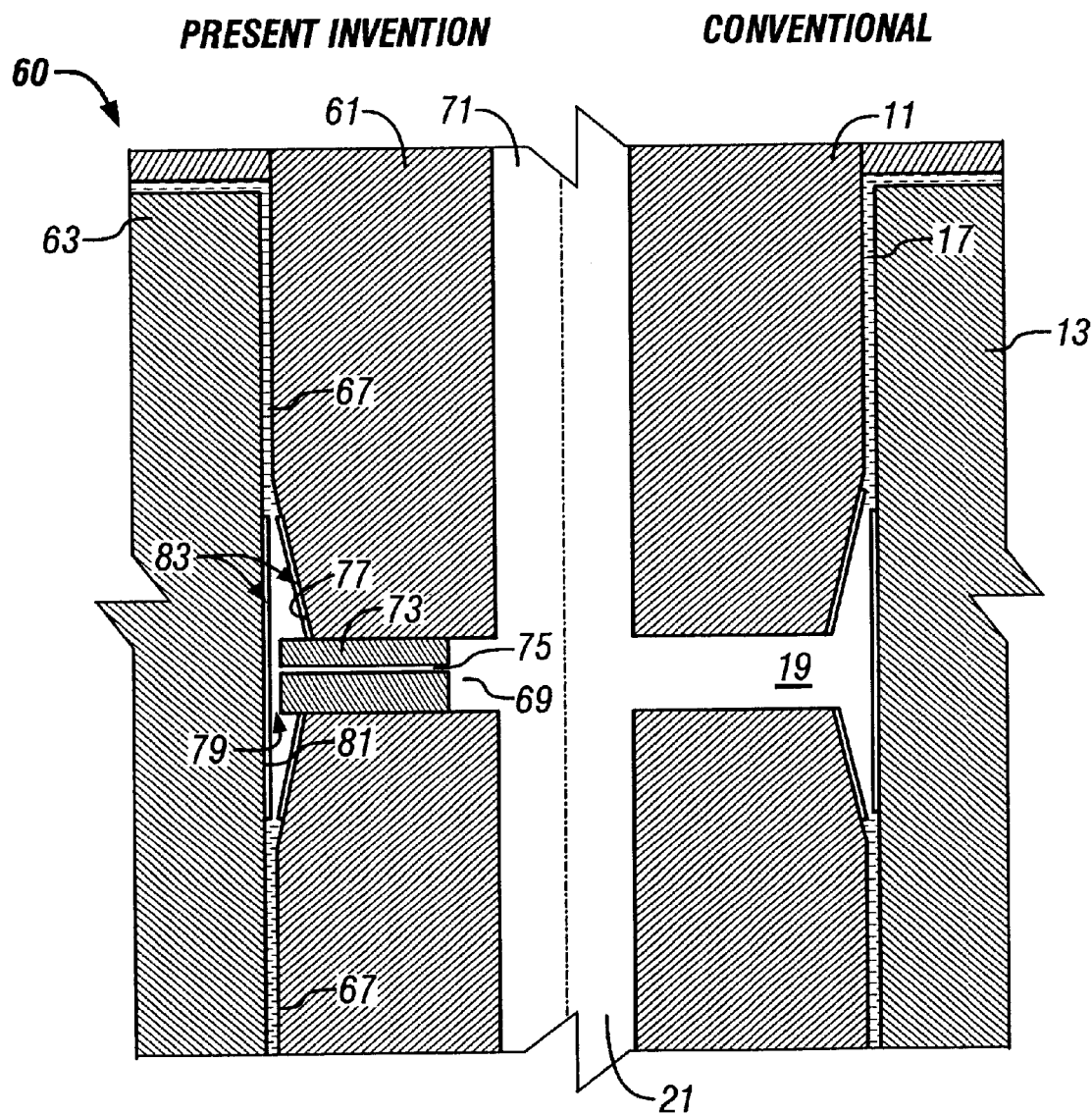
FIG. 3 is an enlarged, split partial-sectional side view of a central portion of a fluid dynamic bearing showing, on the right side, the conventional design of FIG. 1, and, on the left side, a second embodiment of a design constructed in accordance with the present invention.

Referring now to the left side of FIG. 3, a central portion of a fluid dynamic bearing 60 for a spindle motor that is constructed in accordance with a second embodiment of the present invention is shown. For ease of comparison with the prior art, a conventional bearing design is depicted on the right side of FIG. 3, which is part of the overall spindle assembly of FIG. 1. Fluid dynamic bearing 60 includes a shaft 61 that is located in a bearing sleeve 63. A lubricant 67 is located between shaft 61 and sleeve 63 on both ends of the assembly to reduce friction during operation. The assembly has at least one lateral vent hole 69 extending radially through shaft 61. Lateral vent hole 69 is interconnected with an axial vent hole 71 that extends axially through shaft 61. Vent holes 69, 71 are needed to equal the atmospheric pressure exerted on both sides and both ends of the assembly.

The radially outer end of lateral vent hole 69 is provided with a tubular, air-permeable plug 73 having a very small axial passage 75. Ideally, plug 73 is press-fit or bonded in lateral vent hole 69. Passage 75 has a diameter of, for example, approximately 50 μm, and allows the passage of air but not lubricant 67. Plug 73 protrudes radially outward from a recess 77 in the lateral side of shaft 61. In yet a third embodiment or alternative version of the present invention, a clearance 79 between the radial outer end of plug 73 and the radial inner surface 81 of sleeve 63 serves as a labyrinth seal for the lubricant 67, as described above for the first embodiment. In addition, plug 73, recess 77, and an adjacent portion of surface 81 are all coated with a barrier film 83 to resist the flow of the impinging lubricant 67. In still another alternate version of the present invention, plug 73 is formed from a non-wettable material, or a non-wettable porous foam or sintered material, and may be provided with a larger axial passage 75 for enhanced pressure equalization.

In operation, when bearing 60 is subjected to non-operational vibration, such as during the shipping or other handling of the end product when the end product is not in use, lubricant 67 migrates toward lateral vent hole 69. Plug 73 and, if used, the alternate labyrinth seal formed by clearance 79 protrudes from shaft 61 and act as a seal to prevent the migration of lubricant 67 into lateral vent hole 69, even under the most severe non-operational vibration loads. In addition, barrier film 83 and/or the other non-wettable materials that form plug 73, help resist the flow of lubricant toward plug 73 and passage 75.

The present invention has several advantages. A fluid dynamic bearing with the improved lubricant retention design of the present invention overcomes the limitations of prior art designs by preventing lubricant from escaping the bearing interface surfaces and entering the lateral and axial ventilation holes in the bearing shaft. The use of an air-permeable, lubricant-impermeable labyrinth seal formed between the sleeve and the shaft rim or plug effectively retains lubricant between the bearing interface surfaces for operational use. The tubular plug also performs well, even without the labyrinth seal. When the shaft rim or plug are used in conjunction with the barrier film or formed from non-wettable materials, the flow of lubricant into the lateral and axial vent holes during non-operational vibration is further impeded.

While the invention has been shown or described in only some of its forms, it should be apparent to those skilled in the art that it is not so limited, but is susceptible to various changes without departing from the scope of the invention.

What is claimed is:

1. A fluid dynamic bearing, comprising:
   a sleeve having an axial bore;
   a shaft located in the axial bore of the sleeve, the shaft having an axial vent hole extending axially through the shaft, and a lateral vent hole extending radially from the axial vent hole to an exterior of the shaft;
   a set of bearings located between the sleeve and the shaft;
   a lubricant located between the axial bore of the sleeve, the shaft, and the set of bearings to reduce friction during operation; and
   a seal protruding from the shaft to resist a flow of the lubricant into the lateral vent hole.

2. The fluid dynamic bearing of claim 1 wherein the seal is located in a recess in a lateral side of the shaft.

3. The fluid dynamic bearing of claim 1 wherein the seal, an external portion of the shaft, and an adjacent portion of the axial bore of the sleeve are all coated with a barrier film to resist the lubricant.

4. The fluid dynamic bearing of claim 1 wherein the seal is formed from a material that is non-wettable by the lubricant.

5. The fluid dynamic bearing of claim 1 wherein the seal is a plug that is located in the lateral vent hole.

6. The fluid dynamic bearing of claim 5 wherein the plug has an axial passage that is air permeable and lubricant impermeable.

7. The fluid dynamic bearing of claim 5 wherein the plug is press-fit or bonded in the lateral vent hole.

8. The fluid dynamic bearing of claim 5 wherein a radially outer end of the plug and the axial bore form a labyrinth seal for the lubricant.

9. A fluid dynamic bearing for a spindle motor, comprising:
   a sleeve having an axial bore;
   a shaft located in the axial bore of the sleeve, the shaft having an axial vent hole extending through the shaft;
   a recess formed in a lateral outer surface of the shaft;
   a lateral vent hole in the shaft extending radially from the axial vent hole to an exterior of the shaft in the recess;
   a set of bearings located between the sleeve and the shaft;
   a lubricant located between the axial bore of the sleeve, the shaft, and the set of bearings on both axial sides of the lateral vent hole to reduce friction during operation;
   a plug located in and extending radially from the lateral vent hole and the recess to resist a flow of the lubricant into the lateral vent hole during non-operational vibration, wherein the plug has an axial passage for ventilation.

10. The fluid dynamic bearing of claim 9 wherein the plug is radially spaced apart from the axial bore of the sleeve to form a labyrinth seal for the lubricant, wherein the axial passage in the plug is air permeable and lubricant impermeable.

11. The fluid dynamic bearing of claim 9 wherein the plug, the recess, and an adjacent portion of the axial bore of the sleeve are all coated with a barrier film to resist the lubricant.

12. The fluid dynamic bearing of claim 9 wherein the plug is formed from a material that is non-wettable by the lubricant.

13. The fluid dynamic bearing of claim 9 wherein the plug is press-fit or bonded in the lateral vent hole.

* * * * *